US012594882B2

(12) United States Patent
Palmieri et al.

(10) Patent No.: US 12,594,882 B2
(45) Date of Patent: Apr. 7, 2026

(54) AUTOMOTIVE SOUND AMPLIFICATION

(71) Applicant: McLaren Automotive Limited, Woking (GB)

(72) Inventors: Davide Palmieri, Tarragona (ES); Alessio Figuretti, Barcelona (ES); Stefano Izzo, Barcelona (ES); Giuseppe Iossa, Barcelona (ES)

(73) Assignee: McLaren Automotive Limited, Woking (GB)

( * ) Notice: Subject to any disclaimer, the term of this patent is extended or adjusted under 35 U.S.C. 154(b) by 273 days.

(21) Appl. No.: 18/312,253

(22) Filed: May 4, 2023

(65) Prior Publication Data

US 2023/0356656 A1 Nov. 9, 2023

(30) Foreign Application Priority Data

May 4, 2022 (GB) ...................................... 2206523

(51) Int. Cl.
*H04R 7/04* (2006.01)
*B60Q 5/00* (2006.01)
*G10K 15/02* (2006.01)

(52) U.S. Cl.
CPC ............. *B60Q 5/005* (2013.01); *G10K 15/02* (2013.01); *H04R 7/045* (2013.01); *B60Y 2306/11* (2013.01); *H04R 2499/13* (2013.01)

(58) Field of Classification Search
CPC ...... H04R 2499/13; H04R 1/025; H04R 1/02; H04R 2201/021; G10K 15/02; G10K 2210/1282; B60Q 5/005; B60Q 1/543

(Continued)

(56) References Cited

U.S. PATENT DOCUMENTS 5,371,802 A 12/1994 McDonald et al.
10,708,700 B1 * 7/2020 Salter ..................... H04R 1/025
(Continued)

FOREIGN PATENT DOCUMENTS

CN 1251069 A 4/2000
EP 0469023 2/1992
(Continued)

OTHER PUBLICATIONS

Office Action in United Kingdom Appln. No. GB2206523.9, dated Jun. 29, 2022, 4 pages.
(Continued)

*Primary Examiner* — Norman Yu
(74) *Attorney, Agent, or Firm* — Fish & Richardson P.C.

(57) ABSTRACT

An apparatus for simulating the acoustic performance of an automotive vehicle, the apparatus comprising: a processor configured to select an electrical input to be provided to the amplifier in dependence on one or more driving conditions for the vehicle, the electrical input indicating a desired acoustic output for a vehicle and being selected from a plurality of prestored electrical inputs; an amplifier configured to receive the electrical input from the processor and to generate amplified electrical signals of the acoustic output from the electrical input; a transducer configured to generate acoustic vibrations from electrical signals received from the amplifier; and a structural panel configured for placement on the body of the vehicle, wherein the transducer is mounted to the panel such that acoustic vibrations generated by the transducer are emitted from the panel to an environment within or surrounding the vehicle.

20 Claims, 5 Drawing Sheets

(58) Field of Classification Search
    USPC .................................. 381/86, 389, 302, 71.4
    See application file for complete search history.

(56)                    References Cited

U.S. PATENT DOCUMENTS

2003/0123678 A1*  7/2003  Kemmerer ............. H04B 1/082
                                                        381/86
2005/0113168 A1*  5/2005  Maeda ................... G10K 15/02
                                                        463/35
2005/0147237 A1   7/2005  Mills
2011/0085674 A1   4/2011  Fujikawa
2012/0076314 A1   3/2012  Reilly et al.
2012/0275612 A1  11/2012  Vogel et al.
2014/0177866 A1*  6/2014  Peachey ................... B60Q 5/00
                                                        381/86
2015/0199955 A1   7/2015  Draganic 2022/0084498 A1    3/2022  Chang
2022/0201401 A1*   6/2022  Ko ......................... H04R 17/10
2022/0386040 A1*  12/2022  Preisler ................. H04R 7/045

FOREIGN PATENT DOCUMENTS

GB        2254979        10/1992
GB        0469023      * 10/1995
GB        2536108         9/2016
WO     WO 90/13109       11/1990
WO     WO 92/08225        4/1992
WO     WO 2020/150822 A1  7/2020

OTHER PUBLICATIONS

Extended European Search Report in European Appln. No. 23171533.
5, mailed on Jan. 2, 2024, 10 pages.
Office Action in European Appln. No. 23171533.5, mailed on Feb.
10, 2025, 6 pages.

* cited by examiner

Indications of driving conditions ⁓232

AUTOMOTIVE SOUND AMPLIFICATION

CROSS-REFERENCE TO RELATED APPLICATIONS

This application claims priority to GB Patent Application Serial No. 2206523.9, filed on May 4, 2022, the entire contents of which are hereby incorporated by reference.

FIELD OF THE INVENTION

This invention relates to an apparatus for simulating the acoustic performance of an automotive vehicle.

BACKGROUND

A sports car is a type of automotive vehicle that is designed to provide an immersive and exhilarating driving experience. Examples of features of the driving experience that are emphasised in the design of sports cars are handling, acceleration and top speed. The market for sports cars is rapidly growing, and there is fierce competition between competitors within this market. When a consumer is looking to purchase a sports car, they may take a number of factors regarding the performance and appearance of the vehicle into consideration. One of the factors to be considered is the acoustic performance of, or the sound that is generated by, the vehicle. The acoustic performance of a vehicle directly informs the consumer's expectations of the sportiness and exclusivity of that vehicle. For example, a vehicle that generates noticeable engine noise may be seen as more luxurious and of higher quality than a vehicle that generates a less prominent noise. Acoustic performance therefore defines the character of the vehicle in a stimulatory manner.

The acoustic performance of a vehicle has historically been determined by the output of the drive and exhaust systems of that vehicle. More specifically, acoustic vibrations generated by combustion processes that occur in the cylinders of the internal combustion engine of the vehicle determine its acoustic performance.

In recent years limitations have been imposed on the amount of emissions that can be generated by vehicles comprising internal combustion engines, and therefore the number of combustion reactions that can be performed by the engines. Modern-day vehicles are therefore being designed with more efficient combustion engines, or with hybrid or fully electric drive systems that significantly reduce the exhaust gases produced by the vehicle. Such limitations have meant that the acoustic vibrations generated by the drive systems of vehicles are reduced, thereby reducing an important feature characterising the sportiness of these vehicles. Furthermore, a reduction in the frequency and/or quality of acoustic vibrations generated by the vehicle means that the driver is less likely to receive important feedback indicating the performance of the vehicle.

There is a need for an apparatus to, amongst other advantages, circumvent the minimised acoustic output that is generated by drive system of modern-day vehicles.

SUMMARY

According to a first aspect of the present invention there is provided an apparatus for simulating the acoustic performance of an automotive vehicle, the apparatus comprising: a processor configured to select an electrical input to be provided to the amplifier in dependence on one or more driving conditions for the vehicle, the electrical input indicating a desired acoustic output for a vehicle and being selected from a plurality of prestored electrical inputs; an amplifier configured to receive the electrical input from the processor and to generate amplified electrical signals of the acoustic output from the electrical input; a transducer configured to generate acoustic vibrations from electrical signals received from the amplifier; and a structural panel configured for placement on the body of the vehicle, wherein the transducer is mounted to the panel such that acoustic vibrations generated by the transducer are emitted from the panel to an environment within or surrounding the vehicle.

The processor may be connected to a memory, the memory being configured to store: the plurality of prestored electrical inputs indicating desired acoustic outputs to be generated by the apparatus; and one or more tables configured to enable selection, by the processor, of a prestored electrical input indicating desired acoustic output of acoustic vibration in dependence on two or more driving conditions for the vehicle.

The one or more tables may comprise a two-dimensional table that has values of a first driving condition laid out in consecutive columns along its x-axis, and values of a second driving condition laid out in consecutive rows along its y-axis.

The one or more tables may comprise a three-dimensional table that has values of a first driving condition laid out in consecutive rows along its x-axis, values of a second driving condition laid out in consecutive columns along its y-axis and values of a third driving condition laid out in consecutive rows along its z-axis.

The processor may be configured to interpolate between values of driving conditions stored by the memory to estimate a desired acoustic output in dependence on one or more driving conditions for the vehicle.

The one or more driving conditions that are detected for the vehicle may be one or more of: the rotational speed of the output of the vehicle's powertrain, the speed of the vehicle, the torque generated by the vehicle, the gear engaged by the vehicle and the powertrain mode.

According to a second aspect of the present invention there is provided an apparatus for simulating the acoustic performance of an automotive vehicle, the apparatus comprising: an amplifier configured to receive an electrical signal indicating a plurality of live acoustic vibrations transmitted by the vehicle and to generate amplified electrical signals of the desired acoustic output from that live electrical signal; a transducer configured to generate acoustic vibrations from electrical signals received from the amplifier; and a structural panel configured for placement on the body of the vehicle, wherein the transducer is mounted to the panel such that acoustic vibrations generated by the transducer are emitted from the panel to an environment within or surrounding the vehicle.

The plurality of live acoustic vibrations may be recorded from a location on the vehicle that is at least one of the input to an engine of the vehicle and an exhaust system of the vehicle.

The live signal may be recorded using a one or more sensors, the one or more sensors comprising one or more of a microphone, a pressure sensor, and an accelerometer.

The amplifier may further comprise a digital signal processor configured to process and filter the electrical input in order to generate the amplified electrical signals.

The structural panel may be formed of a plurality of prismatic walled cells.

Each cell of the structural panel may be in the shape of a hollow hexagonal prism.

Each cell of the structural panel may be in the shape of a hollow cube.

Each cell of the structural panel may have a width of between 10 and 30 mm and a depth of between 10 and 30 mm.

The structural panel may be constructed from aluminium or a polymeric material.

The apparatus may further comprise a plurality of transducers mounted to the structural panel such that acoustic vibrations generated by each of the plurality of transducers are emitted from the panel to an environment within or surrounding the vehicle.

The one or more transducers may be electrical transducers.

According to a second aspect of the present invention there is provided a vehicle comprising the apparatus of any preceding claim, wherein the structural panel is mounted at a first location on the body of the vehicle.

The acoustic vibrations transmitted by the one or more transducers may be variable in dependence on the location of those transducers on the body of the vehicle.

The structural panel may be mounted in the interior cabin of the vehicle such that acoustic vibrations generated by the one or more transducers are emitted from the panel to an environment within the vehicle.

The structural panel may be mounted on one of an interior door face, a dashboard, a squab support or an interior luggage compartment of the vehicle.

The structural panel may be mounted to an exterior surface of the vehicle such that acoustic vibrations generated by the one or more transducers are emitted from the panel to an environment surrounding the vehicle.

The structural panel may be mounted to one of a bonnet of the vehicle, a roof of the vehicle, a rear surface of the vehicle or a side panel of the vehicle.

The apparatus may further comprise: a second transducer configured to generate acoustic vibrations from electrical signals received from the amplifier; and a second structural panel mounted at a second location on the vehicle, wherein the second transducer is mounted to the second panel such that acoustic vibrations generated by the second transducer are emitted from the second panel to an environment within or surrounding the vehicle.

The vehicle may further comprise an equaliser connected to the transducer configured to provide a frequency of acoustic vibration to the panel that is dependent on the panel of the vehicle from which the acoustic vibrations are to be generated.

The present invention will now be described by way of example with reference to the accompanying drawings. In the drawings:

DETAILED DESCRIPTION

The following description is presented to enable any person skilled in the art to make and use the invention and is provided in the context of a particular application. Various modifications 10 to the disclosed examples will be readily apparent to those skilled in the art.

Figure 1:
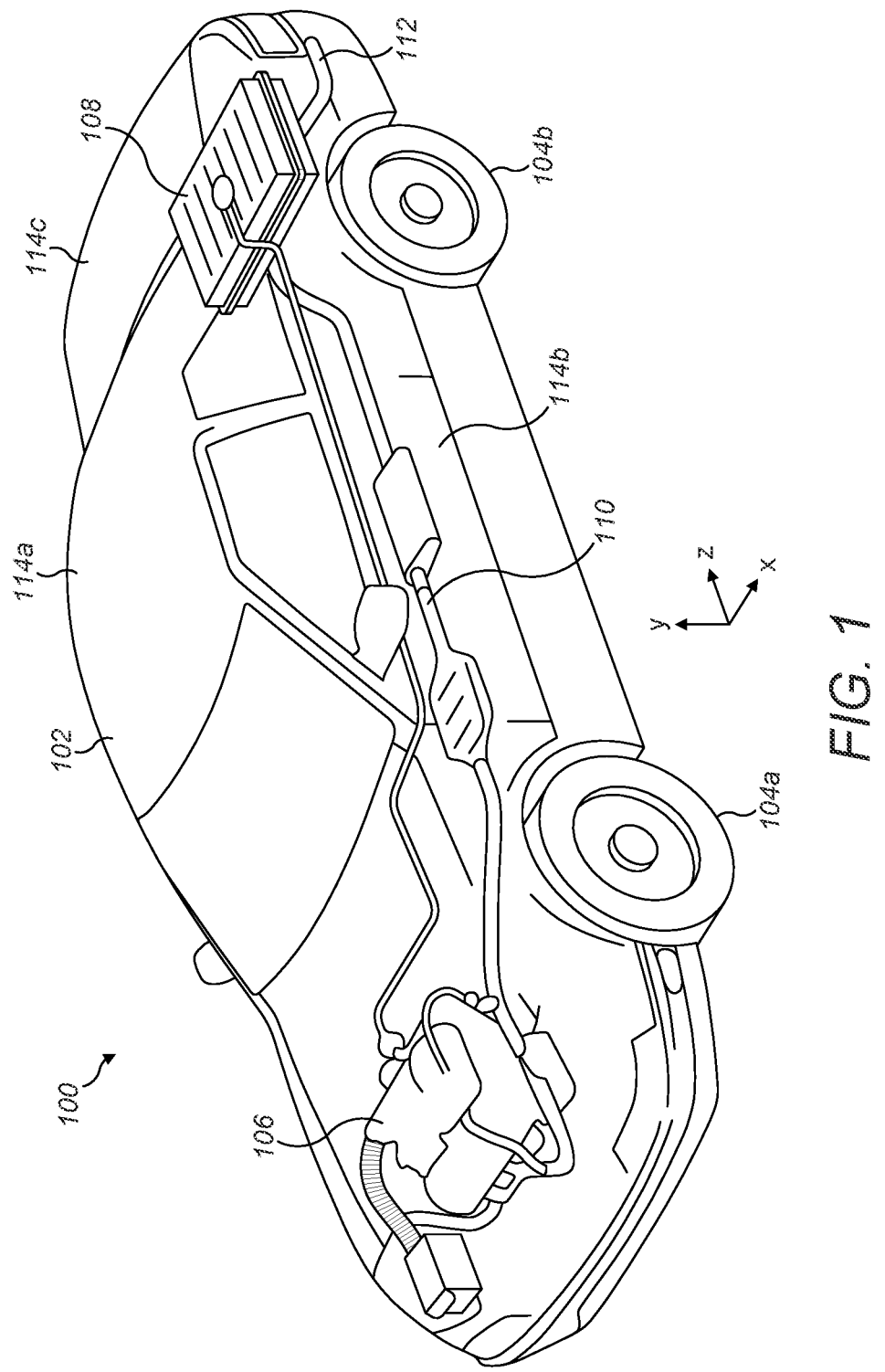
FIG. 1 illustrates the arrangement of an exemplary vehicle.

FIG. 1 illustrates the arrangement of an exemplary vehicle 100. The vehicle is illustrated in perspective. The vehicle 100 may otherwise be referred to as an automobile. The vehicle is capable of transporting people and/or goods over a predetermined distance. The vehicle is preferably designed to travel on land. The vehicle 100 is illustrated in FIG. 1 as a car. However, the vehicle 100 may be any other vehicle that is capable of transporting people and/or goods over land. Examples of alternatives to the vehicle illustrated in FIG. 1 are motorcycles, buses and trucks.

The vehicle 100 comprises a body 102 and a plurality of movable elements 104a, 104b for supporting the vehicle on a surface. In the example illustrated in FIG. 1, the movable elements are wheels. However, it would be appreciated that the movable elements may be any alternative components that are capable of supporting the vehicle on a surface and transferring power into a driving force for the vehicle, such as tracks. The movable elements will from this point forward be referred to as wheels. The body 102 comprises a chassis that supports a cabin within which the occupants of the vehicle can be located. In FIG. 1, although only two wheels are visible, the vehicle comprises four wheels. The wheels that are not visible are arranged symmetrically to wheels 104a, 104b about a plane that traverses the length of the vehicle 100 and bisects the width of the vehicle. The length of the vehicle, in FIG. 1, extends along the z axis. The width of the vehicle extends along the x axis. In other words, the arrangement of the non-visible wheels is a mirror image of the arrangement of the visible wheels along the length of the vehicle. Of the two wheels visible in FIG. 1, a first wheel 104a may be referred to as a front wheel and a second wheel 104b may be referred to as a rear wheel. The vehicle 100 comprises one or more axles (not shown) by which the rear wheels rotate.

The vehicle 100 is powered by a power source 106. The power source forms part of and provides power to a drive system that is configured to drive the vehicle. The power source 106 is illustrated in FIG. 1 as being located at the front of the vehicle. However, the power source 106 in alternative examples may be located at an alternative location in the vehicle, such as at the rear of the vehicle. In the example illustrated in FIG. 1, the power source is an internal combustion engine. The internal combustion engine could be a straight, flat or V-engine having any number of cylinders. The internal combustion engine may be part of a hybrid drive system for the vehicle. In alternative example, the power source may be an electric battery, or an apparatus comprising a plurality of electric batteries. Where the power source comprises one or more electric batteries, the vehicle may be described as an electric vehicle.

Where the power source is an internal combustion engine, or in other similar examples, the vehicle also comprises an exhaust system 110. The exhaust system channels exhaust gases from the internal combustion engine to at least one exhaust outlet 112 on the exterior of the vehicle. The exhaust outlet 112 may otherwise be referred to as a tailpipe. In FIG. 1, the exhaust outlet 112 is located at the rear of the vehicle. However, the exhaust outlet 112 may be located at any alternative location on the vehicle. Where the power source is an internal combustion engine, the vehicle also comprises a fuel tank 108 configured to supply fuel to the power source. Where the vehicle is an electric vehicle, the vehicle may not comprise a fuel tank 108 or an exhaust system 110.

The body of the vehicle is made up of one or more structural panels 114a, 114b, 114c. A structural panel within this context refers to a flat or curved component to which other components of the vehicle are fixed. A flat component is commonly recognised as one that has length and width dimensions that are significantly wider than its depth dimension. The structural panels may be located on, or visible from, the exterior of the vehicle and/or from the interior of the vehicle. The structural panels may be located in a variety of different locations on the vehicle. For example, in FIG. 1 a first structural panel 114a may be located on the exterior of the roof of the vehicle. A second structural panel 114b is located on a front door of the vehicle. A third structural panel 114c is located at the rear of the vehicle. The third structural panel 114c may be located on the exterior of a luggage compartment of the vehicle. Although three panels are identified in FIG. 1, the vehicle may comprise any number of panels. The panels may not be located facing the exterior or interior of the vehicle, and may instead be comprised between an outer shell of the vehicle body and the interior of the vehicle. Examples of alternative locations of structural panels on the exterior of the vehicle are on the front of the vehicle (e.g., over the bonnet of the vehicle) and on a rear door of the vehicle. Examples of locations of structural panels on the interior of the vehicle are on the inside of the doors of the vehicle, on the dashboard of the vehicle and on the interior of the roof of the vehicle. It will be appreciated that many combinations of additional or alternative panels are possible.

Modern-day vehicles, such as the vehicle illustrated in FIG. 1, are typically manufactured either with efficient combustion engines, fully electric power systems or hybrid systems that use the combination of a combustion engines and an electric power systems. These modern vehicles generate fewer combustion reactions, and therefore fewer vibrations that define the acoustic performance of the vehicle. For automotive vehicles such as sports cars, the acoustic performance of the vehicle has a large impact on its desirability to consumers. It is therefore advantageous to provide such vehicles with an apparatus that is configured to simulate, or enhance, the acoustic performance of a vehicle, to maintain desirable acoustic characteristics in spite of the decrease in combustion reactions. The acoustic performance of the vehicle can also be used to provide feedback to a driver indicating that the vehicle is performing as expected.

Figure 2:
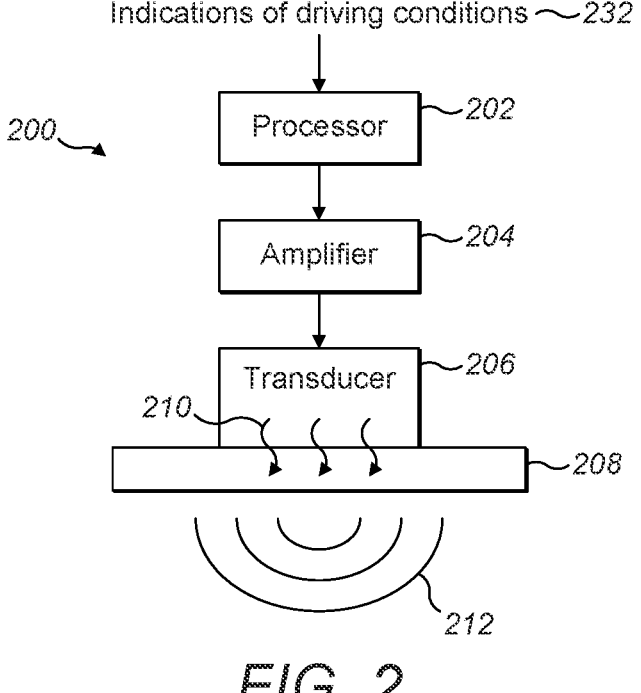
FIG. 2 illustrates a first example of an apparatus for simulating the acoustic performance of an automotive vehicle.

An example of an apparatus 200 that may be implemented within a vehicle such as the one illustrated in FIG. 1, and that is configured to simulate the acoustic performance of the vehicle, is illustrated in FIG. 2. The apparatus comprises a processor 202, an amplifier 204 and a transducer 206. The transducer 206 is connected to a structural panel 208 of the vehicle.

The processor 202 is an electrical component configured to perform one or more processing operations. The processor 202 is illustrated in FIG. 2 as a single processor but may in alternative examples be more than one processor. The processor 202 may comprise code that causes it to perform algorithms or methods as described herein. The processor 202 is configured to receive inputs 232 indicating one or more driving conditions for the vehicle. The processor 202 is configured to select an electrical input to be provided to the amplifier in dependence on one or more driving conditions for the vehicle. The electrical input may comprises one or more electrical signals that are provided to the amplifier 204. The electrical input, in turn, indicates a desired acoustic output for the vehicle. The electrical input that is provided to the amplifier 204 by the processor 202 is selected from a plurality of prestored electrical inputs. The prestored electrical inputs may be stored within the processor 202 itself, or within a memory that is connected to the processor.

The processor 202 may be provided with inputs from other parts of the vehicle. The inputs may be provided to the processor 202 via the Controller Area Network (or CAN bus) of the vehicle. The CAN bus is a software communication channel designed to allow processors on the vehicle to communicate with each other. Thus, the CAN bus connects different vehicle components together. The CAN bus may connect the processor 202 to the dashboard of the vehicle. The CAN bus may alternatively or additionally connect the processor 202 to components of the engines drive system. The CAN bus may alternatively or additionally connect the processor 202 to components of the vehicle's exhaust systems. The components of the vehicle may be sensors recording one or more driving conditions for the vehicle. The processor 202 may be connected to any combination of the vehicle's dashboard, drive system and exhaust system without the presence of a CAN bus. By virtue of being connected to the vehicle's dashboard, drive system and/or exhaust system, the processor 202 may obtain indications 232 of the driving conditions of the vehicle. The processor 202 may receive indications 232 of driving conditions via either wired or wireless means. More detail on exemplary driving conditions for the vehicle that may be provided to the processor 202 is provided below.

The amplifier 204 is connected to the processor 202. In one example the amplifier 204 may be connected to the processor 202 via an electrical connection, such as electrical cables. In another example the amplifier 204 may be connected to the processor 202 via a wireless connection, such as Bluetooth®. The amplifier 204 is an electronic device configured to increase the power of electrical signals that it receives. The amplifier 204 is configured to receive electrical input from the processor and to generate amplified electrical signals of the acoustic output from that input. In other words, the amplifier 204 is configured to receive signals from the processor and to increase the power of those signals so that they are transformed into signals capable of generating desirable acoustic vibrations for the vehicle. The amplifier 204 may amplify its received signal by increasing the frequency of those signals. The amplifier 204 is also connected to the transducer 206. The amplifier 204 may be connected to the transducer 206 by either wired or wireless means, as described above.

In an example, the amplifier 204 may comprise a digital signal processor. The digital signal processor may be configured to process and filter the electrical input in order to generate the amplified electrical signals. The digital signal processor may alter the characteristics of the signals received by the amplifier 204, such as the timing, frequency, phase or spatial traits of the signals. The addition of a digital signal processor may be advantageous as it filters out unwanted characteristics of electrical signals that may have an effect on the acoustic vibrations that are ultimately emitted by the acoustic simulation apparatus. The incorporation of the digital signal processor into the amplifier 204 is advantageous as it provides for a more compact acoustic generation apparatus. This advantage is provided because the filtering function of the apparatus is combined with the function of the amplifier. In an alternative example, the digital signal processor may be incorporated into the apparatus as a separate component to the amplifier 204. In this example, the digital signal processor may be located either between the amplifier 204 and the transducer 206, or between the processor 202 and the amplifier 204.

The transducer 206 is an electronic device that converts energy from one form to another. More specifically, the transducer 206 is configured to convert electrical energy, such as the energy received from the amplifier 204, into another form of energy. The transducer 206 may more specifically be referred to as an acoustic transducer. The transducer 206 may also or alternatively be referred to as an electrical transducer. The transducer 206 may be configured to transfer electrical energy into acoustic energy. The acoustic energy is comprised of acoustic vibrations that are transmitted at a desired frequency. The configuration of acoustic transducers is generally known and would be understood by a person skilled in the art of electrical sound generation. The acoustic transducer may be an electromagnetic acoustic transducer. The basic arrangement of an electromagnetic acoustic transducer comprises a magnet and an electric coil, the electric coil being configured to be driven with an alternating current electric signal at an ultrasonic frequency. The alternating electrical current generates an alternating magnetic field and induces vibration in a material from which the transducer is comprised. The transducer may alternatively be a photovoltaic transducer, a piezoelectric transducer, a chemical transducer, a hall effect transducer or any other suitable transducer.

The transducer 206 configured to generate acoustic vibrations 210 from electrical signals received from the amplifier 204. In addition to emitting acoustic vibrations 210, the transducer 206 comprises a material that is configured to shake in response to electrical signals that it receives in order to transfer acoustic vibrations. Thus, the transducer 206 may also be referred to as a shaker.

In addition to the amplifier 204, the transducer 206 is connected to the structural panel 208. The structural panel 208 is configured for placement on the body of the vehicle. The structural panel is a flat or curved component that is set into, or forms part of, the body of the vehicle. Other components of the vehicle may be mounted to the panel. As described above, a vehicle may be comprised of a number of structural panels. The structural panels may be located on the exterior of the vehicle, on the interior of the vehicle, or in between an exterior shell and an interior shell of the vehicle.

More specifically, the transducer 206 is mounted to the structural panel 208. The transducer 206 is mounted such that acoustic vibrations generated by the transducer are transferred to the panel 108. In other words, the mounting of the transducer 206 onto the structural panel 208 is such that the panels vibrate so that they work as speakers that radiate sound. The acoustic vibrations from the panel 212 may be emitted to an environment within the vehicle, or to an environment surrounding the vehicle. The panel's acoustic vibrations 212 may be emitted to both an environment within and an environment surrounding the vehicle. In FIG. 2, the arrangement shows a transducer 206 mounted to a single structural panel. However, in alternative examples, there may be multiple transducers mounted to a single structural panel. The arrangement may also or alternatively comprise multiple structural panels, each structural panel having one or more transducers mounted to it. The arrangement of an apparatus comprising multiple transducers and/or panels is described in further detail below.

It is mentioned above that the prestored electrical inputs used by the processor 202 may be stored within the processor itself, or within a memory that is connected to the processor. In some examples, the processor 202 may be connected to a memory. The memory may be a random-access memory (RAM), read-only memory (ROM), an optical disc, flash memory, hard disk memory, and other memory devices that may use magnetic, optical, and other techniques to store instructions or other data and that can be accessed by a machine.

Figure 3:
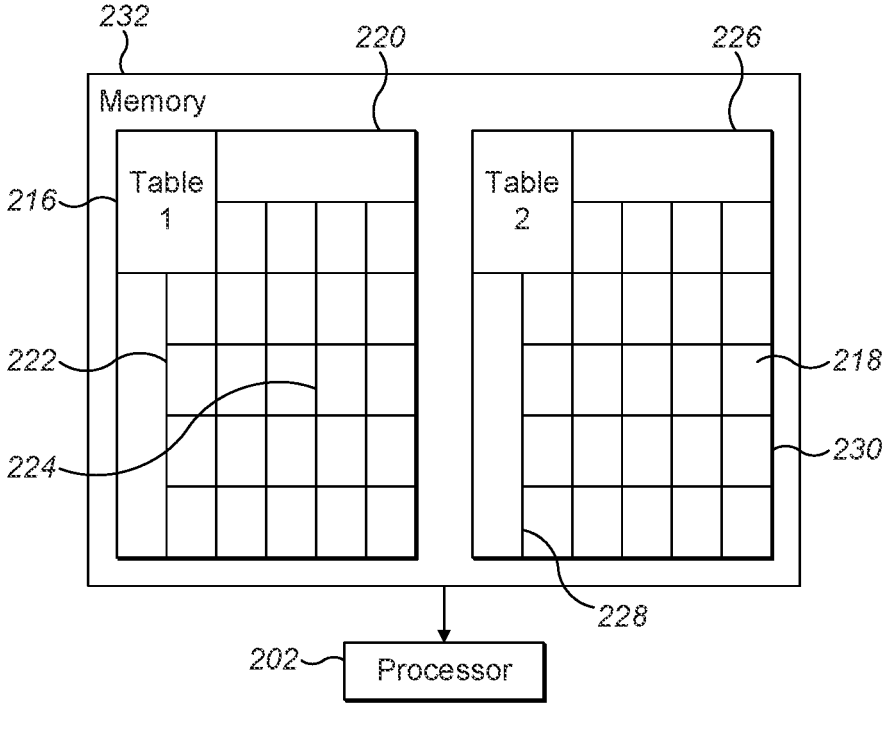
FIG. 3 illustrates an exemplary configuration of a memory for use in an apparatus for simulating the acoustic performance of an automotive vehicle.

An example the of the memory 214 that may be accessed by the processor 202 is illustrated in FIG. 3. The memory 214 may be configured to store the plurality of prestored electrical inputs indicating desired acoustic outputs to be generated by the acoustic simulation apparatus. The memory 214 is further configured to store data regarding one or more driving conditions for the vehicle. The electrical inputs may be stored alongside the one or more driving conditions for the vehicle in such a way that one or more driving conditions may be used by the processor to select the electrical input. The electrical input may be stored alongside the one or more driving conditions in a table. The table may be used as a lookup mechanism by the processor to select a suitable electrical input. In other words, the processor may parse the table, using a value of one or more driving conditions for the vehicle, and select an electrical input to be provided to the amplifier 204 in dependence on the electrical input stored alongside the one or more driving conditions in the table.

The driving conditions for the vehicle are parameters that are indicative of the operation of the vehicle. The driving conditions are used to determine a suitable acoustic output, as the acoustic output of the vehicle should be correlated with the way in which the vehicle is operating. Examples of driving conditions that may be used to determine a desired acoustic output for the vehicle are output of the vehicle's powertrain, the speed of the vehicle, the torque generated by the vehicle, the gear engaged by the vehicle and the powertrain mode of the vehicle. The speed of the vehicle may be measured in miles per hours or kilometres per hour. The powertrain output may be measured in revolutions per minute (rpm). The vehicle torque may be measured in Nm. As an example, if the vehicle is driving at a high speed, the electrical inputs selected by the processor should correspond to acoustic outputs that are associated with that high speed. Such acoustic outputs will typically comprise high frequency vibrations. Accordingly, if the rpm of the vehicle's powertrain is high then electrical inputs selected by the processor should correspond to acoustic outputs associated with high rpm (which should also comprise high frequency vibrations).

As mentioned above, the driving conditions of the vehicle that are used by the processor 202 to select suitable acoustic outputs may be obtained from other parts of the vehicle. The processor may be connected to any combination of the vehicle's dashboard, drive system and exhaust system either with or without the presence of a CAN bus. The inputs may provide the processor 202 with information indicating the driving conditions of the vehicle, and those inputs may be used by the processor to access the memory 214 and select electrical inputs that correspond to those driving conditions. The inputs may be obtained from sensors located around the vehicle. The sensors may measure actual driving conditions or desired driving conditions of the vehicle. An example of a sensor that may measure desired driving conditions may be attached to a user-operated actuator of the vehicle, such as the clutch pedal of the car or the driving wheel. Sensors that measure actual driving conditions of the vehicle, as mentioned above, may be connected to at least one of the vehicle's dashboard, a component of the vehicle's drive system and/or a component of the vehicle's exhaust system.

In FIG. 3, the memory 214 is illustrated as comprising two tables. In FIG. 2, the tables are two-dimensional (2D) tables. A two-dimensional table comprises values of a first parameter laid out in consecutive columns along its x-axis, and values of a second parameter laid out in consecutive rows along its y-axis. The values of in the middle of the table can be selected by cross referencing an x-axis value against a y-axis value. Within the context of the acoustic simulation apparatus, values of a first driving condition are laid out along the x-axis 220 of the first table 216. Values of a second driving condition are laid out along the y-axis 222 of the first table 216. Values of the electrical input to be selected by the processor are laid out in the middle of the first table 224, and can be selected by cross-referencing a value of the first driving condition against a value of the second driving condition.

Similarly, values of a third driving condition are laid out along the x-axis 226 of the second table 218. Values of a second driving condition are laid out along the y-axis 228 of the second table 218. Values of the electrical input to be selected by the processor are laid out in the middle of the second table 230, and can be selected by cross-referencing a value of the first driving condition against a value of the second driving condition.

The memory 214 of FIG. 3 comprises two tables. The memory 214 may alternatively comprise a single table, or more than two tables. Where the memory 214 comprises more than one table, each table may cross-reference different driving conditions against each other. For example, the first table 216 in FIG. 1 may cross-reference vehicle speed on its x-axis against powertrain output on its y-axis. The second table may cross-reference vehicle torque on its x-axis against and the gear engaged by the vehicle on its y-axis. Further tables may cross-reference further driving conditions against each other. A plurality of tables may be used to determine more than one electrical input to be provided to the amplifier, each electrical input being associated with a different acoustic output. Alternatively or additionally, each electrical input may compare the electrical input value selected from different tables to each other, to achieve a higher level of certainty that the selected value corresponds to an appropriate acoustic output for the vehicle.

In FIG. 3, the memory 214 illustrated in FIG. 3 comprises two-dimensional tables 216, 218. In an alternative example, the memory 214 may comprise one-dimensional tables. A one-dimensional table comprises only values of one parameter laid out along a single axis of the table. Within the context of an acoustic simulator, the table may comprise the values of a first driving condition extending along its y-axis, and values of corresponding electrical inputs extending parallel to the values of driving conditions along the y-axis. In this way, each driving condition corresponds to a value of electrical input. A one-dimensional table may otherwise be described as a list. An advantage of a two-dimensional table over a one-dimensional table is that, by using two driving conditions as inputs into the selection of an electrical input, the electrical input selected is more customised to the operational state to the vehicle.

Figure 4:
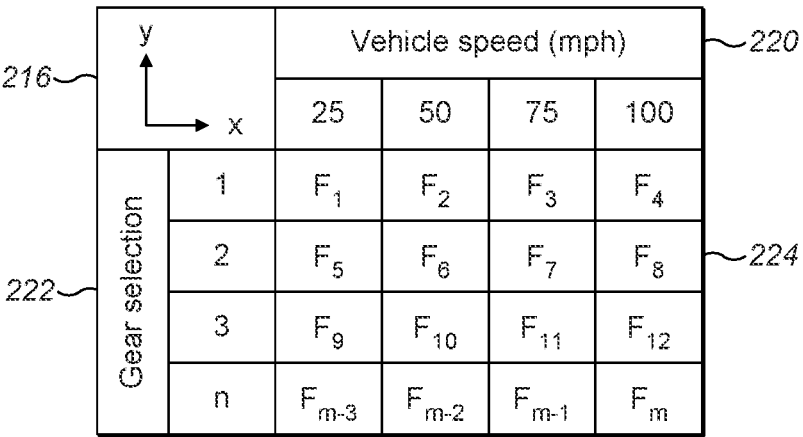
FIG. 4 illustrates a first example of a table that may be stored within the memory of FIG. 3.

A specific example of a table that may be comprised within the memory 214 is illustrated in FIG. 4. In this example, different values of a first driving condition, vehicle speed, are laid out in consecutive columns along the x-axis of the table. Vehicle speed in FIG. 4 is measured in miles per hour (mph). The table in FIG. 4 comprises a selection of four speed values: 25 mph, 50 mph, 75 mph and 100 mph. It would be appreciated that the table may alternatively comprise a greater number of columns comprising speed gradations against which electrical input may be selected. Different values of a second driving condition, gear selection, are laid out in consecutive rows along the y-axis of the table in FIG. 4. The number of gears in the vehicle in FIG. 4 ranges from gear 1 to gear n. N may be 5, 6 or 7, depending on the number of gears comprised within the vehicle. N may be any alternative number. Using a table as illustrated in FIG. 4, together with inputs indicating the driving conditions for the vehicle (i.e., the gear that is engaged, and the vehicle speed), the processor 202 may select one of electrical inputs $F_1$-$F_m$ which is configured to generate an acoustic output corresponding to those driving conditions. For example, if inputs from the vehicle indicate that the vehicle is travelling at 50 mph, and that gear 3 is engaged, then an electrical input of $F_{10}$ is selected by the processor 202. Electrical input $F_{10}$ is then provided to the amplifier 204 by the processor 202.

Figure 5:
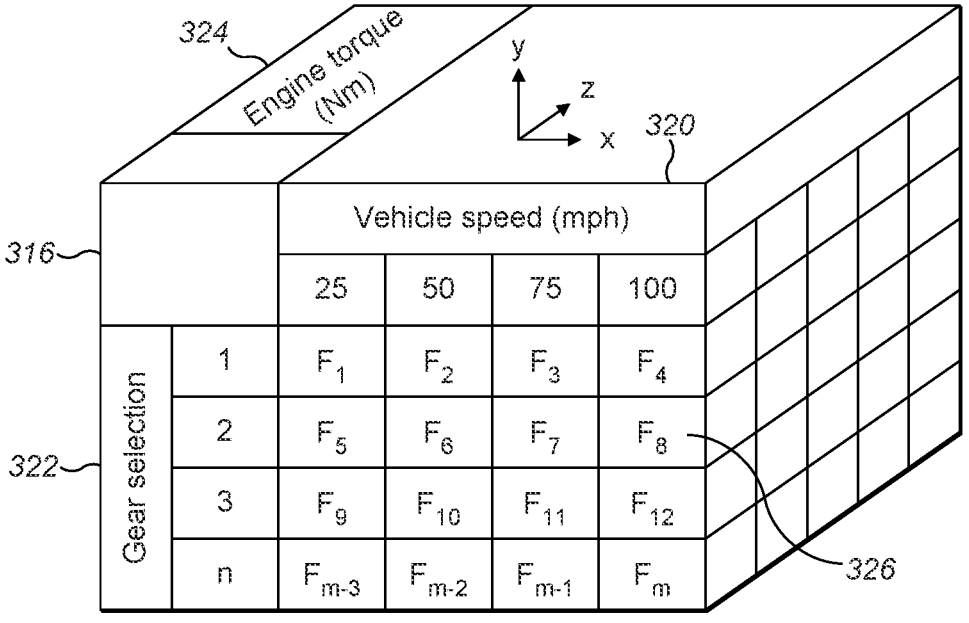
FIG. 5 illustrates a second example of a table that may be stored within the memory of FIG. 3.

An alternative example of a table that may be comprised within the memory 214 of FIG. 3 is illustrated in FIG. 5. In FIG. 5, the table is a three-dimensional (3D) table. A three-dimensional table comprises values of a first parameter laid out in consecutive rows along its x-axis, values of a second parameter laid out in consecutive columns along its y-axis and values of a third parameter laid out in consecutive rows along its z-axis. The values of in the middle of the table can be selected by cross referencing an x, y and z axis values. The memory 214 may comprise only three-dimensional tables, only two-dimensional tables, or a combination of two- and three-dimensional tables. As mentioned above, the memory may also/alternatively comprise one or more one dimensional tables.

Within the context of the acoustic simulator, values of a first driving condition are laid out along the x-axis 320 of the three-dimensional table 316. Values of a second driving condition are laid out along the y-axis 322 of the table. Values of a third driving condition are laid out along the z-axis 324 of the table. Values of the electrical input to be selected by the processor are laid out in the middle of the first table 326. Values of electrical input can be selected by cross-referencing a value of the first driving condition against the second driving condition and the third driving condition.

More specifically, in the example illustrated in FIG. 5, different values of a first driving condition, vehicle speed, are laid out along the x-axis of the table. Vehicle speed in FIG. 5 is measured in miles per hour (mph). The table in FIG. 5 comprises a selection of four speed values: 25 mph, 50 mph, 75 mph and 100 mph. It would be appreciated that the table may alternatively comprise a greater number of columns comprising speed gradations against which electrical input may be selected. Different values of a second driving condition, gear selection, are laid out along the y-axis 322 of the table. Number of gears in the vehicle in FIG. 4 ranges from gear 1 to gear n. The number of gears in the vehicle in FIG. 4 ranges from gear 1 to gear n. N may be 5, 6 or 7, depending on the number of gears comprised within the vehicle. N may be any alternative number. Different values of a third driving condition, engine torque, are laid out along the z-axis 324 of the table. Values of engine torque laid out along the z-axis are not visible in FIG. 5. Using a table as illustrated in FIG. 5, together with inputs indicating the driving conditions (i.e., the gear that is engaged, vehicle speed and the engine torque) for the vehicle, the processor may select one of electrical inputs which is configured to generate an acoustic output corresponding to those driving conditions for the vehicle. In FIG. 5, only electrical inputs $F_1$-$F_m$ are visible. However, it is appreciated that the total number of electrical inputs is equal to $F_m$ multiplied by I, where I is the number of engine torque values, and therefore rows, extending along the z-axis of the table.

An advantage of the use of a three-dimensional table by the memory 214 is that it allows for a more customised acoustic output to be provide for a vehicle. This is because lots of different vehicle parameters, or driving conditions, contribute to the electrical input selection. Different vehicle characteristics result in different acoustic characteristics, so it is advantageous to take as many vehicle characteristics as possible into consideration when determining a suitable acoustic output.

In the description of FIGS. 4 and 5, tables 216 and 316 are described as listing single values of driving conditions along each of their axes. In other words, FIGS. 4 and 5 show each electrical input $F_1$-$F_m$ corresponding to a single value of a driving condition. However, in an alternative example, each electrical input could correspond to a range of driving conditions. In this example, each row and column of the tables in FIGS. 4 and 5 could comprise a range of values of driving conditions for the vehicle. For example, with reference to FIG. 4, where vehicle speed is a driving condition laid out along the x-axis the table, the values on each of the columns at the top of the table may read 25-50 mph, 50-75 mph, 75-100 mph, 100-125 mph. This allows for a broader range of condition values to be used to select a suitable acoustic output. The same approach may be taken with respect to parameters laid out along the y and/or z axes of the tables in the memory 214. Alternatively, or additionally, each electrical input $F_1$-$F_m$ may correspond to a range of values of electrical input.

In an alternative example, the tables of the memory may comprise single values of driving conditions along their axes, and the processor 202 may be configured to interpolate between values of driving conditions stored by in the tables to estimate a desired acoustic output in dependence on one or more driving conditions for the vehicle. Interpolation involves a mathematical calculation for estimating a new data point using two data points located on either side of that point. As an example, looking at the table in FIG. 4, the driving conditions for the vehicle may be that the vehicle gear 2 is engaged and that the vehicle is travelling at 60 mph. The table, however, only has electrical inputs $F_6$ and $F_7$ to be selected, when gear 2 is engaged, for vehicle speeds of 50 mph and 75 mph respectively. In this example, the processor may interpolate between $F_6$ and $F_7$ to determine a suitable electrical input value corresponds to a 60 mph speed when gear 2 is engaged. An advantage of this approach is that fewer driving conditions and electrical input values are stored in the memory, but that nevertheless a customised acoustic output may still be obtained for specific driving conditions. Either the driving conditions or the electrical input values may be interpolated by the processor. The processor may alternatively or additionally be configured to extrapolate values of driving conditions, or electrical input values, stored in the memory for a desired acoustic output. With extrapolation, a new data point is estimated that has a value that is outside of the stored data points. For example, referring to FIG. 4 again, if vehicle gear 2 is engaged and the vehicle is travelling at less than 25 mph, a new electrical input $F_k$ may be calculated using the stored value $F_5$.

The electrical inputs $F_1$-$F_m$ to be selected by the processor 202 may indicate an acoustic output that includes simulated sounds. That is, electrical input may indicate artificially generated sounds, such as those generated on a computer, that replicate sounds that would be generated by the vehicle. In another example, or in addition to the simulated sound, the electrical inputs $F_1$-$F_m$ may indicate real sounds that have been recorded for the vehicle. Those sounds may be pre-recorded sounds, for example during vehicle manufacture and testing. The sounds may be recorded during routine operation of the vehicle, for example by sensors located on the vehicle. The sounds may be associated with the specific vehicle within which the apparatus is to be incorporated. Thus, the sounds associated with electrical inputs $F_1$-$F_m$ may be varied in dependence on the vehicle into which the apparatus is to be incorporated. The simulated sounds may be indicative of the performance of different components of the vehicle. The simulated sounds may be indicative of the performance of the power source (or engine) of the vehicle. The simulated sounds may be indicative of the performance of the exhaust system of the vehicle. The simulated sounds may be indicative of the performance of any other component of the vehicle that is associated with the acoustic performance of the vehicle.

The electrical inputs $F_1$-$F_m$ may indicate an acoustic output that includes a simulated sound for a single vehicle component. For example, each electrical input $F_1$-$F_m$ may be indicative of only the sound generated by the engine of the vehicle. In another example, each electrical input $F_1$-$F_m$ may be indicative a simulated sound for multiple vehicle components. For example, the electrical input may be indicative of the sound generated by the engine of the vehicle, and of the sound generated by the exhaust system of the vehicle. In an example, a single electrical input $F_1$-$F_m$ may be selected by the processor (e.g., from a single table in the memory) to provide a desired acoustic output for the vehicle. In another example, the processor may select multiple electrical inputs (e.g., from multiple tables in the memory) to provide the desired acoustic output for the vehicle. In this second example, each selected electrical input may indicate a simulated sound for a vehicle component. Alternatively, each simulated sound may indicate a different frequency of acoustic vibration for the same vehicle component. Each of the electrical inputs $F_1$-$F_m$ may be indicative of a different frequency of acoustic vibration for a single vehicle component. For example, electrical input $F_1$ may be indicative of a different frequency of acoustic vibration for the engine of a vehicle than the electrical input $F_2$. Alternatively, each of the electrical inputs $F_1$-$F_m$ may be indicative of a different frequency of acoustic vibration for multiple vehicle components. In this way, the electrical input selected by the processor results a different acoustic output being generated by the amplifier, the acoustic output being indicative of a different level of performance of the vehicle.

Figure 6:
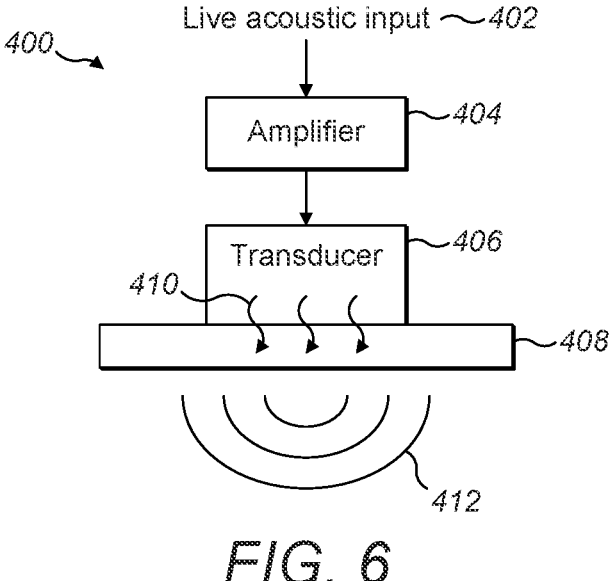
FIG. 6 illustrates a second example of an apparatus for simulating the acoustic performance of an automotive vehicle.

A second example of an apparatus that may be inserted into a vehicle such as that of FIG. 1, and that is configured to simulate the acoustic performance of the vehicle, is illustrated in FIG. 6. This apparatus comprises an amplifier 404, a transducer 406 and a structural panel 408.

The amplifier 404, transducer 406 and structural panel 408 correspond broadly to the corresponding components 204, 206, 208 illustrated in the apparatus of FIG. 2. That is, the amplifier 404 is configured to generate amplified electrical signals of the desired acoustic output from that live electrical signal. The transducer 406, or shaker, is configured to generate acoustic vibrations 410 from electrical signals received from the amplifier. The transducer 406 is mounted to a structural panel 408 of the vehicle, such that acoustic vibrations generated by the transducer are emitted from the panel 412 to an environment within or surrounding the vehicle.

The amplifier 404 of FIG. 6 differs from that of FIG. 2 in that, instead of being connected to and receiving electrical inputs from a processor, the amplifier is configured to receive electrical signals indicating live acoustic vibrations 402 transmitted by the vehicle. The amplifier is further configured to generate amplified electrical signals of the desired acoustic output from the live electrical signal, or acoustic vibrations, received from the vehicle. In order to receive live acoustic vibrations 402, the amplifier 404 may be connected to a device that senses live acoustic vibrations transmitted by the vehicle. The device may be a sensor. The sensor may convert acoustic vibrations into electrical signals to be provided to the amplifier. An example of a suitable sensor is a microphone. An alternative example of a sensor is a pressure sensor or an accelerometer.

The sensor may be located at any position on the vehicle from which acoustic vibrations, or sound, is generated by the vehicle. That is, the live acoustic vibrations may be recorded from a location on the vehicle that is at least one of the input to a power source of the vehicle and an exhaust system of the vehicle. Recording vibrations from such locations is advantageous as the input to the vehicle's power source, and its exhaust system, are the systems that may perform or receive the output of combustion reactions. Thus, these locations are optimal for picking up desirable acoustic vibrations. The sensor may be located within or next to the tailpipe of the vehicle. In another example, the device is located within or close to the power source of the vehicle. In a further example, the device is located on a structural panel of the vehicle that is configured to vibrate in accordance with the drive system for the vehicle.

Electrical signals indicating a plurality of live acoustic vibrations transmitted by the vehicle may be received from more than one sensor of the vehicle. The sensors may be located in more than one location on the vehicle. For example, a first sensor may be located on an engine inlet, and a second sensor may be located close to the vehicle's tailpipe. The use of multiple sensors in a variety of locations may be advantageous as it results in a more well-rounded sound for the vehicle.

The amplifier 404 of FIG. 4 may comprise an integrated processing logic, or may be connected to a separate processor, that selects the frequencies of its received electrical signals to amplify. In other words, the processing logic or processor may select not to amplify certain frequencies of acoustic vibration that are less preferable, and to emphasise frequencies that are more preferable. For example, the processing logic or processor may be configured to filter out engine boom or other undesired resonances from the sound to be amplified. Alternatively, the one or more sensors from which acoustic vibrations are recorded may be configured to perform this processing function. The processing logic or processing device may comprise a digital signal processor as described above with respect to FIG. 2.

An advantage of the use of live acoustic input is that it allows for a more reliable reproduction of vehicle sounds to be omitted from the acoustic simulation apparatus. The apparatus illustrated in FIG. 6 is particularly suitable for use in modern vehicles comprising internal combustion engines. In these vehicles, combustion reactions are generated and therefore the desirable acoustic vibrations are also generated. However, the acoustic vibrations may not be as strong as is necessary to produce a preferable acoustic performance for the vehicle due to the decrease in combustion reactions that are performed by the vehicle. So, an apparatus that emphasises the sounds generated by the vehicle is desirable.

Figure 7:
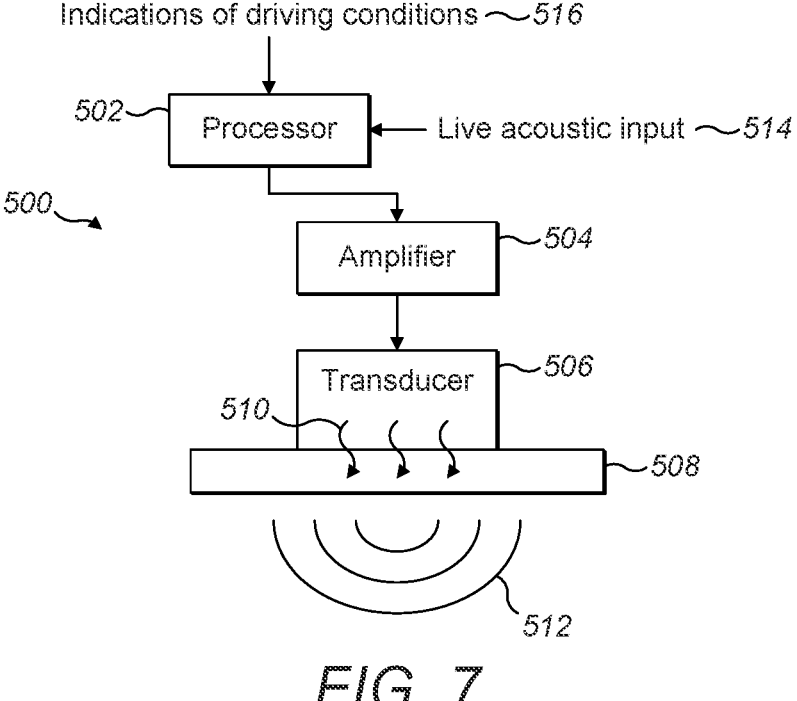
FIG. 7 illustrates a third example of an apparatus for simulating the acoustic performance of an automotive vehicle.

Whilst the apparatuses illustrated in FIGS. 2 and 6 are illustrated as alternative examples of systems for simulating acoustic performance, in a further example the inputs to both of these apparatuses may be combined. An illustration of a system that receives both live acoustic input 514 and electrical input from a processor 502 is illustrated in FIG. 7. The amplifier 504, transducer 506 and panel 508 of FIG. 7 are the same as the corresponding components in FIGS. 2 and 6. Similarly, acoustic vibrations 510 and 512 are the same as corresponding components in FIGS. 2 and 6. The apparatus of FIG. 7 differs from those of FIGS. 2 and 6 in that, in addition to receiving one or more driving conditions of the vehicle (and/or the memory), the processor also receives a live acoustic input for the vehicle. The processor may be configured to process the live acoustic input 514 and to use this input, in addition to obtained indications of driving conditions 516 for the vehicle, to provide electrical input to the amplifier. The amplifier may comprise a digital signal processor as described above with respect to FIG. 2. This arrangement is advantageous as it allows for the acoustic output generated by the apparatus to take into account the existing acoustic performance of the vehicle as well as prestored acoustic inputs. The processor 502 may be able to remove parts of the acoustic performance that are less preferable to acoustic performance, and to emphasise parts that are more preferable. Less preferable parts of acoustic performance may also be replaced by the processor with stored acoustic inputs. Another advantage of the apparatus illustrated in FIG. 7 is that the overall operative state of the vehicle can be taken into account as well as the sound that it is generated by the vehicle. For example, the accelerator pedal of the vehicle may be being pressed, thereby generating high frequency acoustic vibrations, but the vehicle itself may be stationary. Observing the speed of the vehicle as a driving condition as well as the live acoustic input generated by the vehicle allows for a more realistic acoustic simulation to be generated by the simulation apparatus.

As mentioned above, the structural panel to which the transducer of the acoustic apparatus is mounted is a flat or curved component to which other components of the vehicle are fixed.

A flat component is commonly recognised as one that has length and width dimensions that are significantly wider than its depth dimension. The panel may be structured such that its acoustic performance is optimised. The panel may be substantially hollow. In an example, the panel may be comprised of a plurality of prismatic walled cells. In other words, the cells of the panel may be formed of prisms. The prismatic walled cells may have a constant cross-sectional area along their width. The formation of the panels out of prismatic cells optimises their weight to acoustic efficiency ratio.

Figure 8:
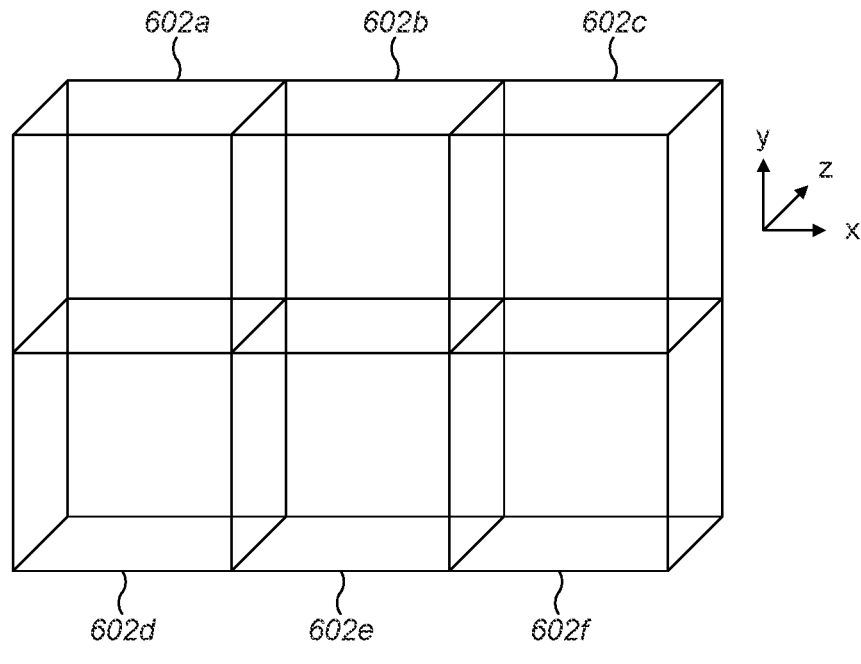
FIG. 8 illustrates a first example of the configuration of a structural panel for use within an apparatus for simulating the acoustic performance of an automotive vehicle.

A first exemplary layout for a structural panel to be used within the apparatus of FIG. 2, 6 or 7 is illustrated in FIG. 8. In the example illustrated in FIG. 8, each cell 602a-602f of the structural panel is in the shape of a hollow cube. Each cell comprises four walls surrounding the perimeter of the cube. FIG. 8 illustrates six exemplary cells of the panel. It would be appreciated that the panel may comprise many more than six cells. A structural panel formed of hollow cubes has been shown to provide favourable acoustic properties and low density, resulting in a low weight of the panel.

Figure 9:
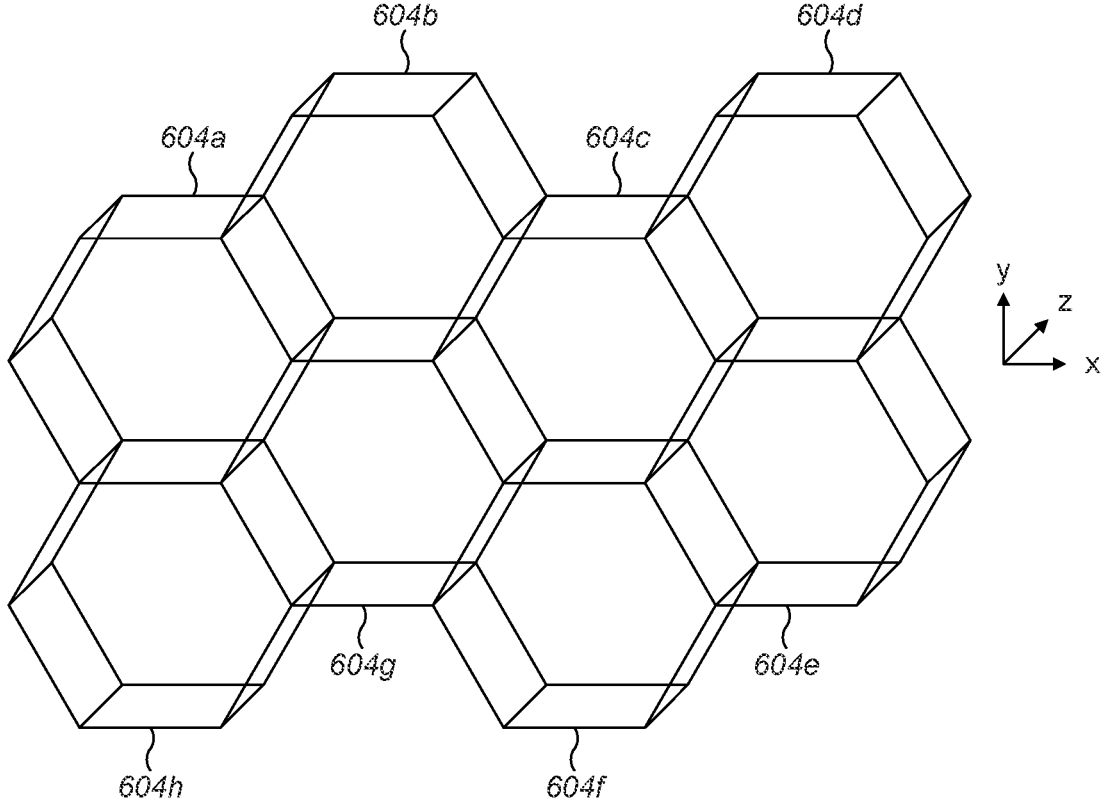
FIG. 9 illustrates a second example of the configuration of a structural panel for use within an apparatus for simulating the acoustic performance of an automotive vehicle.

An alternative exemplary layout for a structural panel to be used within the apparatus of FIG. 2, 6 or 7 is illustrated in FIG. 9. In the example illustrated in FIG. 9, each cell 604a-604h of the structural panel is in the shape of a hollow hexagonal prism. Each cell comprises six walls surrounding the perimeter of the hexagon. FIG. 9 illustrates eight exemplary cells of the panel. It would be appreciated that the panel may comprise many more than eight cells. The configuration of the panel comprising hollow hexagonal prisms may also be described as a honeycomb structure. As with the arrangement of hollow cubes illustrated in FIG. 8, the honeycomb structure of FIG. 9 is advantageous due to its favourable acoustic properties and low density.

In the figures illustrated in FIGS. 8 and 9, the width of the panels extends in the x direction, and the height of the panels extends in the y direction. The depth of the panels extends in the z direction. In an example, each cell of the structural panel may have a width of between 10 and 30 mm, and a height of between 10 and 30 mm. In a specific example of the arrangement illustrated in FIG. 8, each cell may have a width of 20 mm and a height of 20 mm. In a specific example of the arrangement illustrated in FIG. 9, each side of the hexagonal face of the cells may have a length of 20 mm. Each cell of the structural panel may have a depth of between 10 and 30 mm. In one specific example, each cell of the structural panel may have a depth of 15 mm. In another specific example, each cell of the structural panel may have a depth of 25 mm. The dimensions of the structural panels may be selected to maximise acoustic performance whilst also minimising weight and space considerations.

The structural panels of the acoustic apparatus may be constructed from a high acoustic efficiency material. A high acoustic efficiency material is a material that is able to efficiently transfer acoustic vibrations through a component constructed of that material. Examples of high acoustic efficiency materials from which the panels may be constructed are aluminium and polymeric materials. In addition to their beneficial acoustic properties, these materials also have advantageously low densities, reducing the overall weight of the structural panels. Other suitable materials that have a high acoustic efficiency may alternatively be used. The structural panel may be connected to the main structure of the vehicle by an isolated fixing. The use of an isolated fixing may further allow for flexibility of the panel and vibration of the transducer against the panel. This improves the transmission of acoustic waves from the transducer to the panel. It may also further reduce the weight of the acoustic apparatus comprising the panel.

It is mentioned above that the structural panels 208, 408, 508 are configured for placement on the body of the vehicle. More specifically, the structural panel configured to be mounted at a first location on the body of the vehicle. The structural panel is a flat or curved component that is set into, or forms part of, the body of the vehicle. Other components of the vehicle may be mounted to the panel. As described above, a vehicle may be comprised of a number of structural panels. The structural panels may be located on the exterior of the vehicle, on the interior of the vehicle, or in between an exterior shell and an interior shell for the vehicle.

In a first example, the structural panel 208, 408, 508 may be mounted in the interior cabin of the vehicle such that acoustic vibrations generated by the transducer are emitted from the panel to an environment within the vehicle. In other words, the structural panel may be mounted to the inside of the vehicle. The structural panel may be visible to an occupant from the interior of the vehicle (i.e., exposed to the internal environment of the vehicle), or may be covered by one or more sheets of material in order to separate the panel from the interior of the vehicle. Examples of locations within the interior of the vehicle on which the structural panel may be mounted are an interior door face, a dashboard, a squab support or an interior luggage compartment of the vehicle. The apparatus may comprise multiple structural panels. Each panel may be located at a different position in the interior of the vehicle.

An advantage of the structural panels being on the interior of the vehicle is that acoustic output generated by the simulation apparatus can be more readily experienced by the user inside the cabin of the vehicle, when they are driving. In addition to the sound that can be heard by the user, the vibrations generated by the transducers and passed to the structural panels may be felt by occupant on the interior of the vehicle. The feel of acoustic vibrations, in addition to their sound, further improves the immersive driving experience offered to the user by the apparatus. An advantage of having structural panels located in multiple positions in the interior of the vehicle is that the user is presented with a more immersive sensory experience whilst they are seated in the vehicle, with noises and vibrations emanating from multiple locations within the vehicle.

Alternatively, or in addition to mounting to an internal surface of the vehicle, one or more structural panels of the acoustic apparatus may be mounted to an exterior surface of the vehicle. In other words, the structural panel may be mounted to the outside of the vehicle. The mounting of the structural panel to an exterior surface of the vehicle is such that acoustic vibrations generated by the one or more transducers are emitted from the panel to an environment surrounding the vehicle. As with the mounting of panels to internal vehicle surfaces, the structural panel may be visible to an occupant from the exterior of the vehicle (i.e., exposed to the external environment of the vehicle), or may be covered by one or more sheets of material in order to separate the panel from the exterior of the vehicle. Examples of locations on the exterior of the vehicle on which the structural panel may be mounted are the bonnet of the vehicle, the roof of the vehicle, a rear surface of the vehicle or a side panel of the vehicle.

An advantage of the structural panels being mounted on the exterior of the vehicle is that acoustic output generated by the simulation apparatus can be more readily experienced by individuals in the vicinity of the vehicle. This is desirable to many consumers of vehicles such as sports cars, to whom the perception of the vehicle by others is important.

The exact position of the transducer, and structural panel from which acoustic vibrations are to be emitted, may be dependent on the specific vehicle within which the acoustic simulation apparatus is to be located. More specifically, the transducers and panels may be positioned based on where for acoustic output is expected to be emitted on the vehicle. In many vehicles, acoustic output is powertrain and exhaust specific. Thus, it is expected for transducers and structural panels to be located, for the most part, on the exterior of the vehicle close to the tailpipe and power source of the vehicle. It may be advantageous for transducers and structural panels of the apparatus to be located on both the exterior and interior of the vehicle. This arrangement allows for multiple parts of the vehicle to vibrate simultaneously, creating a consistent sensory output around and within the vehicle.

The apparatus illustrated in FIGS. 2, 6 and 7 may further comprise a plurality of transducers mounted to a single structural panel. In this example, the plurality of transducers may be mounted such that acoustic vibrations generated by each of the plurality of transducers are emitted from the panel to an environment within or surrounding the vehicle. An advantage of having multiple transducers mounted to a structural panel of the vehicle is that the transducers can work in combination to create a rounded sound emanating from the panel. In addition, the acoustic output emitted from the panels can be maximised by increasing the number of transducers mounted to the panel. The panel may comprise two transducers. The panel may comprise more than two transducers.

It is mentioned above that the structural panels of the vehicle may be located in a variety of different locations on the vehicle. In an example, the apparatus may comprise multiple structural panels. Each structural panel may comprise a transducer mounted to that panel. For example, the apparatus illustrated in FIGS. 2, 6 and/or 7 may, in addition to comprising a first transducer and a first structural panel, comprise a second transducer configured to generate acoustic vibrations from electrical signals received from the amplifier and a second structural panel mounted at a second location on the vehicle. The second transducer is mounted to the second panel such that acoustic vibrations generated by the second transducer are emitted from the second panel to an environment within or surrounding the vehicle. The apparatus may comprise more than two panels, each panel having a corresponding transducer mounted to it. The apparatus may comprise more than one transducer mounted to each of its multiple panels.

As has been briefly mentioned above, an advantage of having an apparatus comprising multiple structural panels is that the vehicle is able to generate a more complete and realistic acoustic experience whilst they are seated in the vehicle, with noises and vibrations emanating from multiple locations around and within the vehicle. The acoustic simulation apparatus is therefore able to more accurately replicate the sounds that would be generated by a sports car through the use of multiple transducers and panels.

The structural panels and accompanying transducers may be located in a variety of different locations around the vehicle. The location of a panel on the vehicle may have an effect on the sound that is transmitted, or expected to be transmitted, by that panel. For example, due to differences in damping, a structural panel that is located on the front bonnet of the vehicle may have to vibrate at a different frequency to a panel located on the door of the vehicle in order to generate the same audible output. Furthermore, a panel located on the front bonnet of the vehicle may be expected to vibrate at a different frequency to a panel located near the tailpipe of the vehicle, as the latter location is one from which the audible results of combustion reactions are expected to be output.

In order to ensure that acoustic vibrations generated from the apparatus are realistic, the vibrations may be variable in dependence on the location of those transducers on the body of the vehicle. The acoustic simulation system may comprise an equaliser that is configured to provide a frequency of acoustic vibration to the panel that is dependent on the location of the panel from which the acoustic vibrations are to be generated on the vehicle. The equaliser may be located within each transducer of the apparatus, or may be connected to each transducer. The equaliser may be comprised within the processor of FIG. 2, 6 or 7, or alternatively may be comprised within the amplifier illustrated in these figures. The equaliser may be configured to modify vibrations transmitted by the amplifier to ensure that the transducer emits vibrations of a suitable frequency. The equaliser may be configured to modify vibrations that are output by the transducer to ensure that they are provided to the panels at a suitable frequency.

More specifically, each structural panel located on a vehicle may be associated with a distinct resonant frequency. The resonant frequency of each panel may be a function of its size, shape and/or its location on the vehicle. Acoustic vibrations from a transducer that pass through the structural panel may cause the panel to vibrate at its resonant frequency. The vibration of a panel at its resonant frequency may lead to the omission of undesirable noise from the panel, in addition to the desired acoustic output from the panel. Thus, an equaliser may be provided to mitigate the vibration of a structural panel at resonant frequency. In other words the equaliser may counteract, or balance out, undesirable acoustic output generated by the panel as a result of the resonant frequency of that panel.

Additional advantages of the use of an acoustic simulation apparatus as described herein are provided below. A first advantage is an increase in the attribute performance of the vehicle. That is, a vehicle with the acoustic apparatus described herein generates a desirable acoustic output that attracts consumers to the vehicle, whilst also allowing the vehicle to adhere to the modern-day emission requirements. Furthermore, as mentioned above, the acoustic performance of the vehicle also be used to provide feedback to a driver indicating that the vehicle is performing as expected. Another advantage is the low weight of the overall system, which may be improved by the use of structural panels comprising hollow prismatic walled cells. The apparatus comprises a single system for audio enhancement of the vehicle, which may be incorporated into the interior and exterior of the vehicle. Similarly, the use of a single system for the audio enhancement of the vehicle reduces overall vehicle cost.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus for simulating the acoustic performance of an automotive vehicle, the apparatus comprising:

a processor configured to select an electrical input to be provided to the amplifier in dependence on one or more driving conditions for the automotive vehicle, the electrical input indicating a desired acoustic output for the automotive vehicle and being selected from a plurality of prestored electrical inputs;

a memory connected to the processor, the memory being configured to store:

the plurality of prestored electrical inputs indicating desired acoustic outputs to be generated by the apparatus; and one or more tables configured to enable selection, by the processor, of a prestored electrical input indicating desired acoustic output of acoustic vibration in dependence on three or more driving conditions for the automotive vehicle;

an amplifier configured to receive the electrical input from the processor and to generate amplified electrical signals of the acoustic output from the electrical input;

a transducer configured to generate acoustic vibrations from electrical signals received from the amplifier; and a structural panel configured for placement on the body of the automotive vehicle, wherein the transducer is mounted to the structural panel such that acoustic vibrations generated by the transducer are emitted from the structural panel to an environment within or surrounding the automotive vehicle, wherein the one or more tables comprises a three-dimensional table that has values of a first driving condition laid out along a first dimension of the three-dimensional table, values of a second driving condition laid out along a second dimension of the three-dimensional table, and values of a third driving condition laid out along a third dimension of the three-dimensional table.

2. The apparatus of claim 1, wherein the one or more tables comprises a two-dimensional table that has values of the first driving condition laid out in consecutive columns along its x-axis, and values of the second driving condition laid out in consecutive rows along its y-axis.

3. The apparatus of claim 1, wherein the three-dimensional table has values of the first driving condition laid out in consecutive rows along its x-axis, values of the second driving condition laid out in consecutive columns along its y-axis, and values of the third driving condition laid out in consecutive rows along its z-axis.

4. The apparatus of claim 1, wherein the processor is configured to interpolate between values of driving conditions stored by the memory to estimate a desired acoustic output in dependence on one or more driving conditions for the automotive vehicle.

5. The apparatus of claim 1, wherein the one or more driving conditions that are detected for the automotive vehicle are one or more of: the rotational speed of the output of the automotive vehicle's powertrain, the speed of the automotive vehicle, the torque generated by the automotive vehicle, the gear engaged by the automotive vehicle and the powertrain mode.

6. An apparatus for simulating the acoustic performance of an automotive vehicle, the apparatus comprising:

an amplifier configured to receive an electrical signal indicating a plurality of live acoustic vibrations transmitted by the automotive vehicle and to generate amplified electrical signals of the desired acoustic output from that live electrical signal;

a transducer configured to generate acoustic vibrations from electrical signals received from the amplifier;

a structural panel configured for placement on the body of the automotive vehicle, wherein the transducer is mounted to the structural panel such that acoustic vibrations generated by the transducer are emitted from the structural panel to an environment within or surrounding the automotive vehicle; and

a memory configured to store one or more tables configured to enable selection of a prestored electrical input indicating a desired acoustic output of the acoustic vibrations in dependence on three or more driving conditions for the automotive vehicle, wherein the one or more tables comprises a three-dimensional table that has values of a first driving condition laid out along a first dimension of the three-dimensional table, values of a second driving condition laid out along a second dimension of the three-dimensional table, and values of a third driving condition laid out along a third dimension of the three-dimensional table.

7. The apparatus of claim 6, wherein the plurality of live acoustic vibrations are recorded from a location on the automotive vehicle that is at least one of the input to an engine of the automotive vehicle and an exhaust system of the automotive vehicle, and wherein the live signal is recorded using a one or more sensors, the one or more sensors comprising one or more of a microphone, a pressure sensor, and an accelerometer.

8. The apparatus of claim 1, wherein the amplifier further comprises a digital signal processor configured to process and filter the electrical input in order to generate the amplified electrical signals.

9. The apparatus of claim 1, wherein the structural panel is formed of a plurality of prismatic walled cells.

10. The apparatus of claim 9, wherein each cell of the structural panel is in the shape of a hollow hexagonal prism.

11. The apparatus of claim 9, wherein each cell of the structural panel is in the shape of a hollow cube.

12. The apparatus of claim 1, wherein the structural panel is constructed from aluminium or a polymeric material.

13. The apparatus of claim 1, further comprising a plurality of transducers mounted to the structural panel such that acoustic vibrations generated by each of the plurality of transducers are emitted from the structural panel to an environment within or surrounding the automotive vehicle, wherein one or more transducers are electrical transducers.

14. An automotive vehicle comprising the apparatus of claim 1, wherein the structural panel is mounted at a first location on the body of the automotive vehicle, and the acoustic vibrations transmitted by the one or more transducers are variable in dependence on the location of those transducers on the body of the automotive vehicle.

15. The automotive vehicle of claim 14, wherein the structural panel is mounted in the interior cabin of the automotive vehicle such that acoustic vibrations generated by the one or more transducers are emitted from the structural panel to an environment within the automotive vehicle.

16. The automotive vehicle of claim 14, wherein the structural panel is mounted to an exterior surface of the automotive vehicle such that acoustic vibrations generated by the one or more transducers are emitted from the structural panel to an environment surrounding the automotive vehicle.

17. The vehicle of claim 14, wherein the apparatus further comprises:

a second transducer configured to generate acoustic vibrations from electrical signals received from the amplifier; and a second structural panel mounted at a second location on the automotive vehicle, wherein the second transducer is mounted to the second structural panel such that acoustic vibrations generated by the second transducer are emitted from the second structural panel to an environment within or surrounding the automotive vehicle.

18. The vehicle apparatus of claim 1, further comprising an equaliser connected to the transducer configured to provide a frequency of acoustic vibration to the structural panel that is dependent on the structural panel of the automotive vehicle from which the acoustic vibrations are to be generated.

19. An apparatus for simulating the acoustic performance of an automotive vehicle, the apparatus comprising:

electrical circuitry configured to receive the electrical input and to generate amplified electrical signals of an acoustic output from the electrical input;

a transducer configured to generate acoustic vibrations from electrical signals received from the electrical circuitry;

a structural panel formed of a plurality of prismatic walled cells and configured for placement on the body of the automotive vehicle, wherein the transducer is mounted to the structural panel such that acoustic vibrations generated by the transducer are emitted from the structural panel to an environment within or surrounding the automotive vehicle; and a memory configured to store one or more tables configured to enable selection of a prestored electrical input indicating a desired acoustic output of the acoustic vibrations in dependence on three or more driving conditions for the automotive vehicle, wherein the one or more tables comprises a three-dimensional table that has values of a first driving condition laid out along a first dimension of the three-dimensional table, values of a second driving condition laid out along a second dimension of the three-dimensional table, and values of a third driving condition laid out along a third dimension of the three-dimensional table.

20. The apparatus of claim 1, wherein the three-dimensional table is a first table, and the one or more tables comprises a second table, the first and second tables being cross-referenced against each other.

\* \* \* \* \*